United States Patent [19]

Nakamura et al.

[11] 3,835,404

[45] Sept. 10, 1974

[54] EXTRACTING CIRCUIT FOR REPRODUCING CARRIER SIGNALS FROM A MULTIPHASE MODULATED SIGNAL

[75] Inventors: Hiroshi Nakamura, Sagamihara; Hiroaki Ohyama, Tokyo, both of Japan

[73] Assignee: Fujitsu Limited, Kawasaki, Japan

[22] Filed: Nov. 29, 1972

[21] Appl. No.: 310,475

[30] Foreign Application Priority Data

Dec. 1, 1971 Japan ................................ 46-96995

[52] U.S. Cl. .................... 329/104, 178/88, 307/232, 328/151, 325/322

[51] Int. Cl. ............................................ H03k 9/00

[58] Field of Search ...... 329/104, 50; 328/134, 151, 328/155; 307/232, 295; 325/320, 322, 323; 178/66 A, 88

[56] References Cited

UNITED STATES PATENTS

| | | | |
|---|---|---|---|
| 2,937,273 | 5/1960 | Franco | 329/50 X |
| 3,142,806 | 7/1964 | Fernandez | 325/322 X |
| 3,349,181 | 10/1967 | Ito | 325/320 X |
| 3,349,329 | 10/1967 | Crafts | 325/320 |
| 3,538,446 | 11/1970 | Leonard | 328/155 |
| 3,564,433 | 2/1971 | Miller | 325/320 X |

*Primary Examiner*—Alfred L. Brody
*Attorney, Agent, or Firm*—Staas, Halsey & Gable

[57] ABSTRACT

A carrier reproducing circuit for demodulating a signal transmitted by a pulse coded modulation-multiphase modulation system in which the output of a carrier extracting circuit is sampled by a clock pulse of a bit repetitive frequency in a sampling circuit and the sampled output is applied to a band-pass filter having a pass band of a carrier frequency to reproduce a carrier of reduced phase jitter.

6 Claims, 7 Drawing Figures

EXTRACTING CIRCUIT FOR REPRODUCING CARRIER SIGNALS FROM A MULTIPHASE MODULATED SIGNAL

BACKGROUND OF THE INVENTION

1. Field of the Invention

This invention relates to a carrier reproducing circuit in a demodulator of a pulse coded modulation-multiphase modulation system.

2. Description of the Prior Art

With a pulse coded modulation-multiphase modulation system or a multiphase shift keying (hereinafter referred to as PSK) system, a system for demodulating a signal by reproducing a carrier exhibits an excellent code error characteristic. However, a conventional carrier reproducing circuit consists of, for example, a multiplier, a band-pass filter and a frequency divider and where the number of modulation phases is $n$, a PSK wave is multiplied by $n$, a signal of a predetermined band is extracted by the band-pass filter from the multiplied output and the extracted signal is frequency divided into $1/n$, thus reproducing a non-modulated carrier. With such a conventional carrier reproducing circuit, where the number of the modulation phases $n$ is small, for example, 2 or 4, jitter due to the influence of a modulation pattern does not so much matter but where the number $n$ is as large as 8 or 16, the jitter caused by the influence of the modulation pattern presents a serious problem. Namely, as the modulation phase increases in number, the influence of jitter on demodulation increases, even if jitter is slight.

SUMMARY OF THE INVENTION

The present invention has for its object to reproduce a carrier of extremely small phase jitter.

Briefly stated, a carrier reproducing circuit of this invention is provided with a carrier extracting circuit, a sampling circuit and a band-pass filter in which the output of the carrier extracting circuit is sampled by a clock pulse of a bit repetitive frequency only at a sampling point in the sampling circuit and the sampled output is applied to the band-pass filter having a pass band of the carrier frequency, thereby reproducing a non-modulated carrier.

Other objects, features and advantages of this invention will become apparent from the following description taken in conjunction with the accompanying drawings.

DESCRIPTION OF THE PREFERRED EMBODIMENTS

Figure 1:
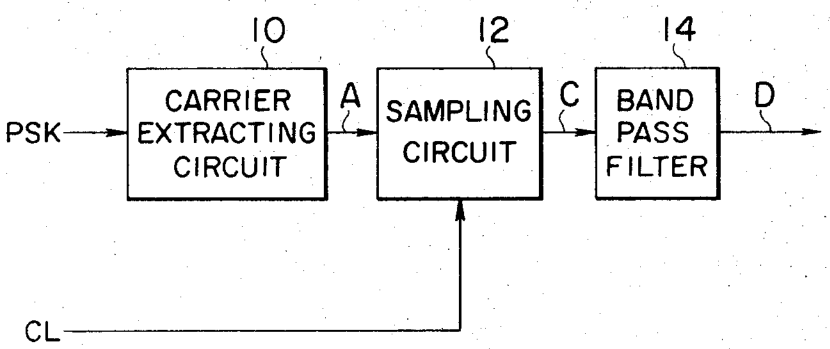
FIG. 1 is a block diagram showing an example of this invention.

FIG. 1 illustrates schematically one example of this invention, in which a transmitted PSK wave is applied to a carrier extracting circuit 10 to extract a carrier contained in the PSK wave. The carrier extracting circuit 10 may be of a desired system such as a multiplying system in which the PSK wave is multiplied by the number of the modulation phases and frequency divided to reproduce the carrier as described previously; a reverse modulation system; a direct reproducing system or the like. The output of the carrier extracting circuit becomes a non-modulated wave theoretically, but in practice, since the PSK wave is subjected to very severe band restriction, the influence of intersymbol interference appears, with the result that at transition, that is, in the neighborhood of the center between bits, the phases become displaced from those at the sampling point, that is, in the vicinity of the center of the bits. Therefore, the use of the carrier of the output from the carrier extracting circuit 10 as the carrier for demodulation in a demodulator presents a problem in the case where the number of the modulation phases is large. Then, the output of the carrier extracting circuit 10 is sampled by a clock pulse CL of a bit repetitive frequency in a sampling circuit 12 only at the sampling point except at the transition and a non-modulated carrier can be obtained with a band-pass filter 14. In the case of the aforesaid multiplying system, the sampled output is frequency divided by a frequency divider to provide a reproduced carrier.

Figure 2A:
FIGS. 2A to 2D are waveform diagrams for explaining the operation of the example depicted in FIG. 1.
Figure 2B:
Figure 2C:
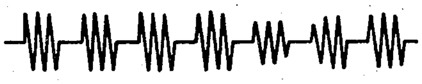
Figure 2D:
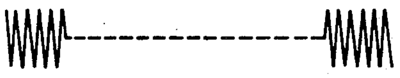

FIG. 2A is one example of the output waveform from the carrier extracting circuit 10, showing that the output is affected by a modulation pattern. FIG. 2B shows the waveform of the clock pulse CL of the bit repetitive frequency, which need not always be a rectangular wave. FIG. 2C shows the output waveform from the sampling circuit 12 and FIG. 2D shows the output waveform from the band-pass filter 14. Namely, by sampling the output of the carrier extracting circuit 10 with timing corresponding to the sampling point for signal reproduction, it is possible to obtain a carrier of small phase jitter.

Figure 3:
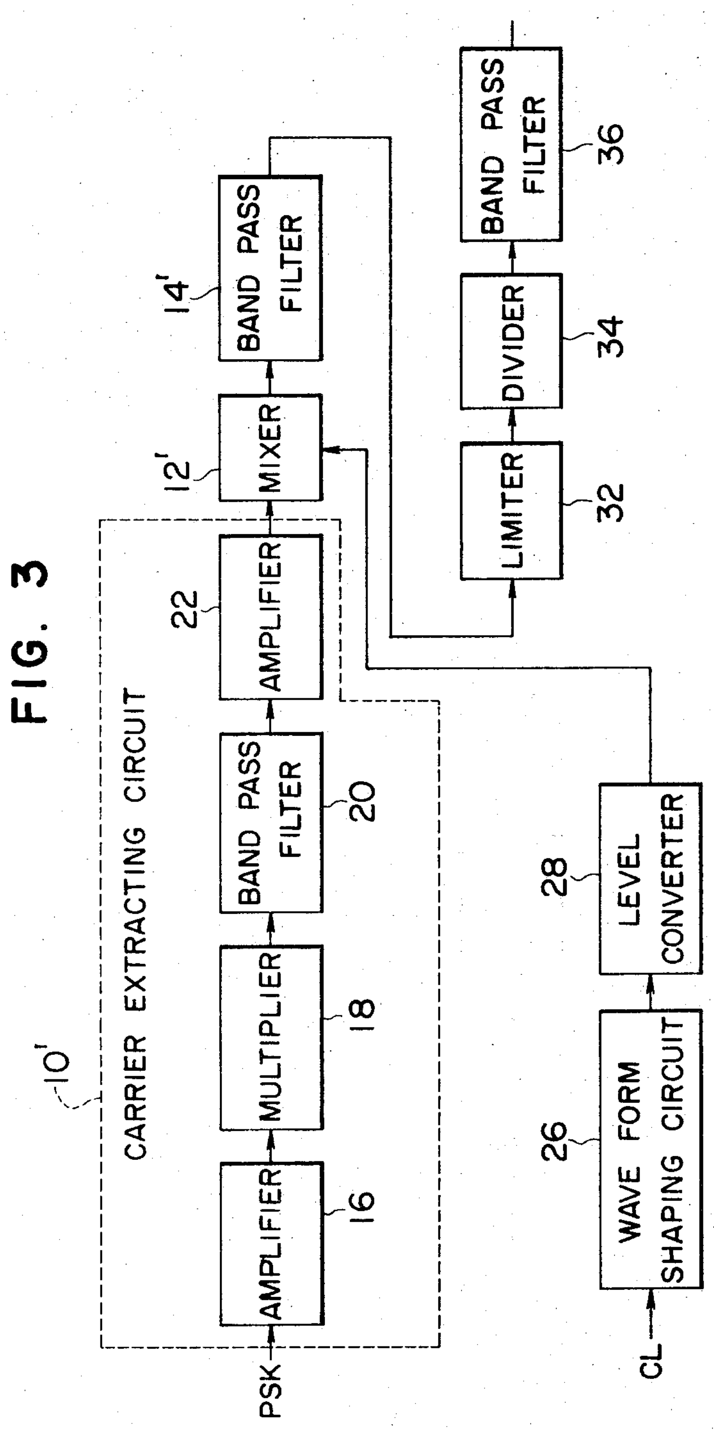
FIG. 3 is a block diagram illustrating the detailed construction of the example of FIG. 1.

FIG. 3 is a detailed block diagram of the example of this invention, which will hereinbelow be described in connection with an eightphase PSK wave. After amplification by an amplifier 16, the PSK wave is multiplied by a multiplier 18 8 times and the multiplied output is applied to a band-pass filter 20 to remove unnecessary bands resulting from the multiplication and then is amplified by an amplifier 22, thereafter being fed a mixer 12'. The circuits preceding to the mixer 12' constitute the carrier extracting circuit of the multiplying system. Further, the clock pulse CL is shaped by a waveform shaping circuit 26 into a rectangular waveform and timing adjustment is achieved so that the phase of the rectangular clock pulse may coincide with the sampling point. Then, in a level converter 28 the level adjustment of the clock pulse fed to the mixer 12' is carried out and in the mixer 12', the output of the amplifier 22 is sampled with the clock pulse. The mixer 12' corresponds to the sampling circuit shown in FIG. 1 and its output is a high-frequency wave which is discontinuous in waveform in terms of time, which is applied to a narrow-band filter 14' to remove noises therefrom and provide an output wave whose waveform is continuous in terms of time. Since this output wave is slightly amplitude modulated, it is rendered by a limiter 32 into a waveform of constant amplitude and frequency divided one-eighth by a divider 34 and then applied to a band-pass filter 36 having a pass band of the carrier frequency, thus providing a non-modulated wave synchronized with the carrier of the PSK wave.

Figure 5:
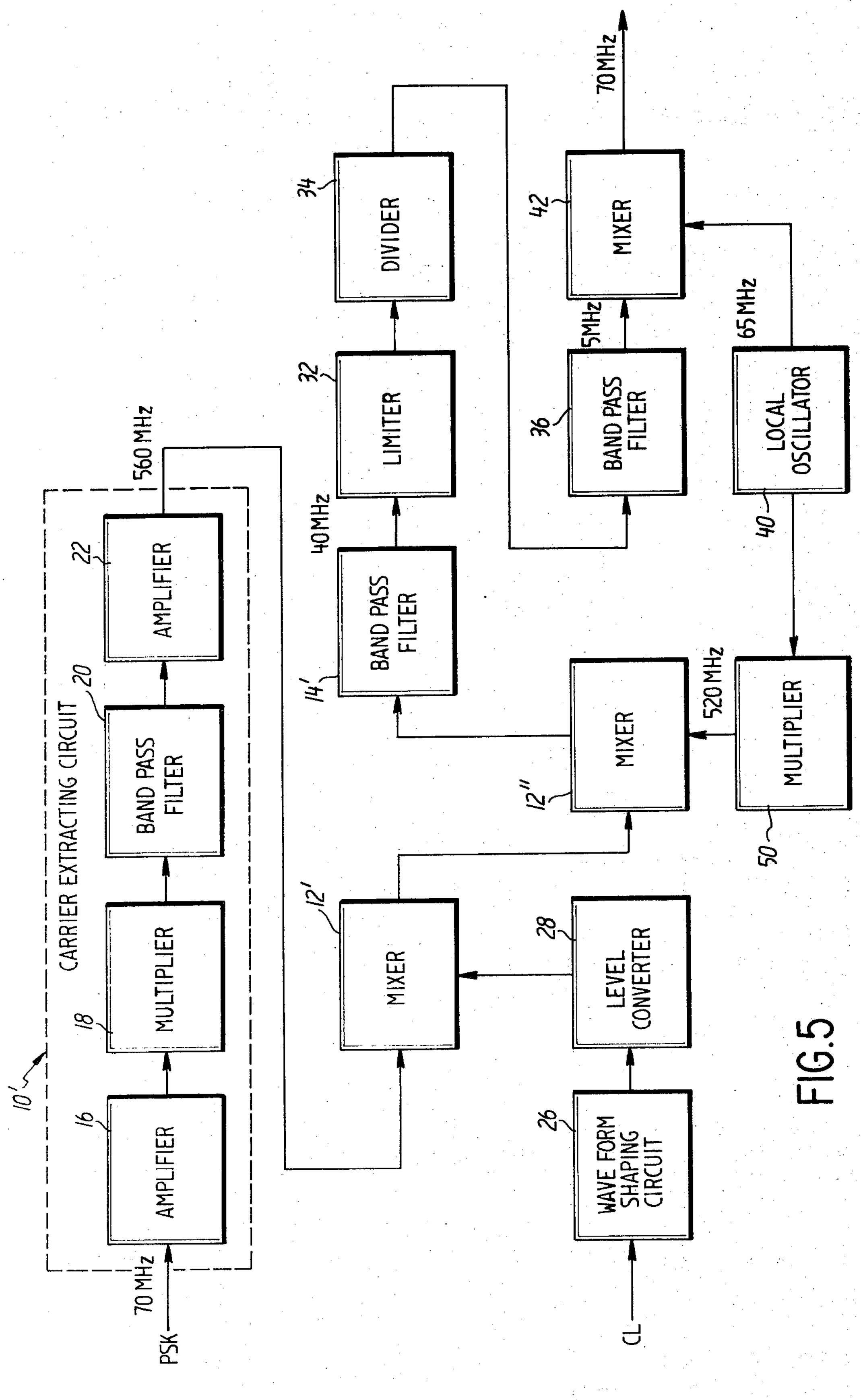

With regard to FIG. 5, assuming that the carrier of the PSK wave has a frequency of, for example, 70MHz, it is multiplied 8 times to 560MHz and where the multiplied output is frequency divided to one-eighth and sampled by the sampling circuit or mixed 12, the frequency of the input to the frequency divider 34 is very high, so that the construction of the frequency divider 34 is not easy. In such a case, the output of a local oscillator 40 of, for example, 65MHz is multiplied eight times to 520MHz by a multiplier 50 and the output of 560MHz from the sampling or mixer circuit 12 is beat by a mixer 12'' with the output of 520MHz down by 40MHz and the resulting output is frequency divided to one-eighth by a divider 34. Thus, the input frequency to the frequency divider 34 is lowered and its construction becomes easy. Further, the output from the divider 34 thus frequency divided to 5MHz and the aforementioned output of 65MHz from the local oscillator 40 can be combined with each other by a mixer 42 to provide a carrier of 70MHz, which is the same in frequency as the carrier of the input PSK wave.

Figure 4:
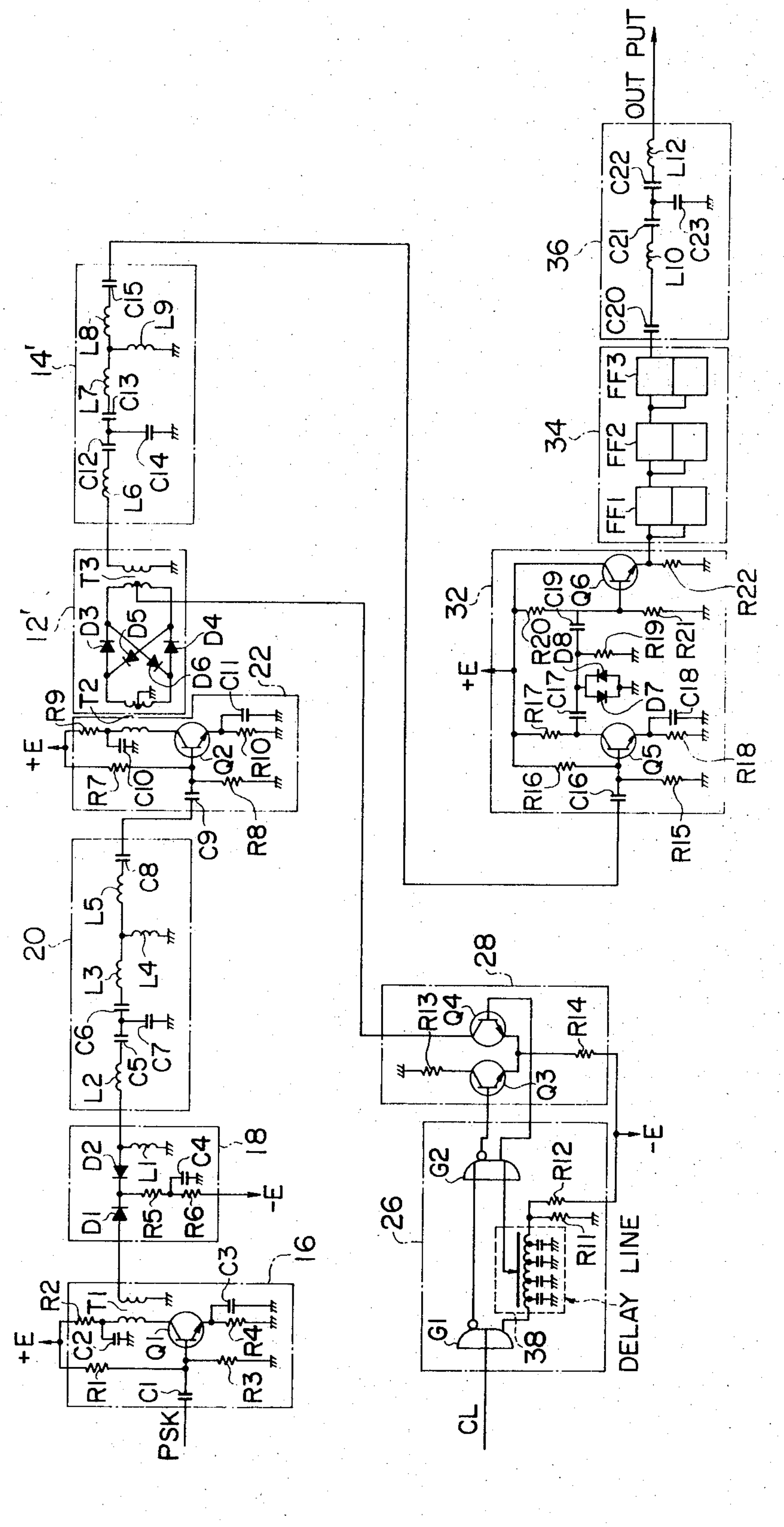
FIG. 4 is a circuit diagram showing one example of the concrete circuit construction of the example depicted in FIG. 3.

FIG. 4 illustrates the detailed circuit construction of the example of this invention shown in FIG. 3. The amplifier 16 is made up of a transistor Q1, resistors R1 to R4 and capacitors C1 to C3, to which a power source voltage +E is applied and the output from which is applied to the multiplier 18 through a coupling transformer T1. The multiplier 18 comprises diodes D1 and D2, resistors R5 and R6, a capacitor C4 and an inductance L1 and is supplied with a power source voltage −E. The multiplication utilizes the non-linear characteristic of the diodes D1 and D2 and the output from the multiplier is fed to the band-pass filter 20. The band-pass filter 20 is a constant K-type band-pass filter formed with inductances L2 to L5 and capacitors C5 to C8 and its pass band is selected at a frequency which is eight times the carrier frequency.

The output of the band-pass filter 20 is amplified by the amplifier 22 comprised of a transistor Q2, capacitors C9 to C11 and resistors R7 to R10 and the amplified output is applied to the mixer 12′ through a coupling transformer T2.

Further, the clock pulse CL is supplied to the waveform shaping circuit 26, made up of gate circuits G1 and G2, resistors R11 and R12 and a delay circuit, and the clock pulse CL is shaped into a rectangular wave of a width dependent upon the delay time of a delay circuit 38 and the shaped output is fed to the level converter 28. The level converter 28 is formed with a current switching amplifier comprised of transistors Q3 and Q4 and resistors R13 and R14 and the output from the level converter is applied to the mixer 12′.

The mixer 12′ is formed with diodes D3 to D6, which is similar in construction to a ring modulator and in which timing adjustment is achieved so that the phase of the clock pulse may coincide with the sampling point and the output from the amplifier 22 is sampled with the level adjusted output from the level converter 28. Since the sampled output has a discontinuous waveform as shown in FIG. 2C, noise components are removed and a continuous output wave is obtained by the band-pass filter 14′ making up a constant K-type band-pass filter comprising inductances L6 to L9 and capacitors C12 to C15.

The output wave thus obtained is rendered into a waveform of a constant amplitude by the limiter 32 comprising transistors Q5 and Q6, resistors R15 to R22, capacitors C16 to C19 and diodes D7 and D8. The output from the limiter 32 is frequency divided to one-eighth by the frequency divider 34 comprised of flip-flop circuits FF1 to FF3. The frequency divided output is applied to the band-pass filter 36 formed with capacitors C20 to C23 and inductances L10 to L12, thus deriving therefrom a nonmodulated carrier synchronized with the carrier of the PSK wave.

As has been described in the foregoing, in the carrier reproducing circuit of this invention, the carrier obtained with the carrier extracting circuit is sampled by the sampling circuit only at the sampling point at which the phase of the carrier is accurate and the sampled carrier is discontinuous in terms of time, but the continuous carrier can be produced by the band-pass filter, so that the resulting carrier is of small phase jitter. Therefore, the carrier reproducing circuit of this invention is very excellent as a carrier reproducing circuit for use in a multiphase modulation system which is severely demanded to eliminate phase jitter from the carrier. In the prior art, the band width of the band-pass filter is required to be narrow to decrease the phase jitter, but this is disadvantageous in the case of a time division multiplex (PCM - (PSK) - T DMA) system, but in the present invention, the phase jitter is extremely decreased as described above and problems caused by phase jitter are not encountered. Further, the sampling width band is selected in accordance with the condition of band restriction imposed on the input PSK wave and the waveform of the clock pulse for sampling is not limited specifically to such a rectangular waveform as in the foregoing example and it is a matter of course that even if the clock pulse has a sinusoidal waveform, the extracted carrrier can be thereby sampled above a predetermined level. In our experiment on the foregoing example, the ratio of phase jitter was improved about 6dB as compared with that in conventional circuits. Further, the S/N ratio can be improved, that is, the frequency components in the neighborhood of the transition are removed from the extracted carrier and noises contained in those components are removed simultaneously, so that noises are suppressed as a whole.

The present invention is not limited specifically to the foregoing example and various modifications and variations may be effected without departing from the spirit stated in the appended claims.

What is claimed is:

1. In a system wherein a carrier having a known carrier frequency is modulated with information comprising bits occurring at a known bit repetitive frequency differing from the carrier frequency by a pulse-coded modulation-multiphase modulation transmitter to produce a signal for transmission, and having a receiver for the transmitted signal, wherein the transmitted signal as received is subject to jitter, a carrier reproducing circuit for use in the receiver for recovering and reproducing the carrier frequency of the received signal, substantially free of the effects of jitter, comprising:

a. carrier extracting means to which the received signal is supplied, for extracting the carrier component therefrom;

b. sampling means responsive to a clock signal of the said known bit repetitive frequency for sampling the extracted carrier component output of said carrier extracting means to provide a discontinuous output signal therefrom; and c. band-pass filter means for receiving and filtering the discontinuous output signal of said sampling means and having a bandpass substantially equal to the carrier frequency.

2. A carrier reproducing circuit as claimed in claim 1, wherein, for a transmitted signal of *n*-phase modulation, said carrier extracting means comprises a multiplier for multiplying the received signal by *n* times, and a first band-pass filter for receiving the output of said multiplier and having a band pass of *n* times the frequency of the received signal.

3. A carrier reproducing circuit as claimed in claim 2, wherein said band-pass filter means comprises a second band-pass filter circuit for receiving and filtering the output of said sampling means and a frequency divider circuit for frequency dividing the output of said band-pass filter circuit by a factor of 1/*n*.

4. A carrier reproducing circuit as claimed in claim 1, wherein the clock pulse is applied to a waveform shaping circuit and a level converter circuit whose output, in turn, is applied to said sampling means.

5. A carrier reproducing circuit as claimed in claim 1, wherein said sampling means has a sampling width selected in accordance with the condition of band width restriction imposed upon the input signal.

6. In a system wherein a carrier having a known carrier frequency is modulated, with information comprising bits occurring at a known bit repetitive frequency differing from the carrier frequency, by a pulse-coded modulation-multiphase modulation transmitter to produce a pulse code modulated-pulse shift keyed (PCM-PSK) signal for transmission, and having a receiver for the transmitted signal, wherein the transmitted signal as received is subject to jitter, a carrier reproducing circuit for use in the receiver for recovering and reproducing the carrier frequency of the received signal, substantially free of the effects of jitter, comprising:

a. an extracting circuit responsive to the received PCM-PSK signal for extracting said carrier component from the received signal;

b. a sampling circuit for sampling the output of said carrier extracting circuit with a clock pulse of the said bit repetitive frequency; and c. a band-pass filter supplied with the output of said sampling circuit for filtering the output of said sampling circuit.

* * * * *